US007966572B2

(12) United States Patent
Matthews et al.

(10) Patent No.: US 7,966,572 B2
(45) Date of Patent: Jun. 21, 2011

(54) USER INTERFACE TRANSITION

(75) Inventors: David A. Matthews, Seattle, WA (US);
Kanwal VedBrat, Seattle, WA (US);
Hillel N. Cooperman, Sammamish, WA
(US); Sterling M. Reasor, Bellevue, WA
(US); Charles Cummins, Seattle, WA
(US); J. Craig Hally, Sammamish, WA
(US); Mark R. Ligameri, Snohomish,
WA (US); Timothy P. McKee, Seattle,
WA (US); Giampiero M. Sierra,
Seattle, WA (US); Timothy D. Noonan,
Issaquah, WA (US); Eric R. Flo,
Sammamish, WA (US); **Charles W.
Stabb**, Seattle, WA (US)

(73) Assignee: Microsoft Corporation, Redmond, WA
(US)

( * ) Notice: Subject to any disclaimer, the term of this
patent is extended or adjusted under 35
U.S.C. 154(b) by 1604 days.

(21) Appl. No.: 10/783,380

(22) Filed: Feb. 20, 2004

(65) Prior Publication Data

US 2005/0188313 A1     Aug. 25, 2005

(51) Int. Cl.
*G06F 3/00* (2006.01)
(52) U.S. Cl. ........ 715/810; 715/835; 715/764; 715/821;
715/824; 715/745
(58) Field of Classification Search .................. 715/810,
715/835, 764, 821, 824, 745
See application file for complete search history.

(56) References Cited

U.S. PATENT DOCUMENTS

| 5,105,184 | A | * | 4/1992 | Pirani et al. | 345/629 |
| 5,564,004 | A | * | 10/1996 | Grossman et al. | 715/835 |
| 5,694,561 | A | * | 12/1997 | Malamud et al. | 715/805 |
| 5,781,894 | A | * | 7/1998 | Petrecca et al. | 705/14 |
| 5,905,492 | A | * | 5/1999 | Straub et al. | 715/744 |
| 6,011,537 | A | * | 1/2000 | Slotznick | 715/733 |
| 6,865,268 | B1 | * | 3/2005 | Matthews et al. | 379/265.09 |
| 2003/0046557 | A1 | * | 3/2003 | Miller et al. | 713/186 |
| 2003/0088570 | A1 | * | 5/2003 | Hilbert et al. | 707/100 |
| 2003/0122864 | A1 | * | 7/2003 | Jenne et al. | 345/738 |
| 2003/0163576 | A1 | * | 8/2003 | Janssen et al. | 709/229 |

OTHER PUBLICATIONS

Rathbone, Andy, Windows XP for Dummies, 2001, Wiley Publishing, Inc., pp. 63, 66,73, 159, 165-169, 233-235 & 276.*
Enin, "Batch Launcher 1.0", Retrieved on Feb. 28, 2007, at <<http://www.simtel.net/product/php[id]62501[cid]301[SiteID]simtel.net>>, GadgetCity, 2006, pp. 1-3.
Ricart, "The Complete Idiot's Gide to Linux", Second Edition, 2000, Que Corporation, pp. 5.
"Sending Instant Message", retrieved on Feb. 26, 2007, at <<http://proquest.safaribooksonline.com/print?xmild=1592000606/ch14lev1sec234>>, pp. 1-2.
Langer, "Visual QuickStart Guide Mac OS X 10.1", Maria Langer, 2002, pp. 5.
MIdnite, "Mac OS X", at <<http://www.guildebookgallery.org/pics/gui/startupsshutdown/login/macosx101-1-1.png>>, Apple Computer, Inc., 1983-2001, pp. 5.
Gnome 2.2.0 in RedHat 9, retrieved on May 24, 2008 at <<www.gnome.org/press and www.guidebookgallery.org/screenshots/gnome220redhat9>>, release Feb. 5, 2003, pp. 1-2.
Ricart, The Complete Idiot's Guide to Linux, Que Corporation, USA, 2000, pp. 67, 71.

* cited by examiner

*Primary Examiner* — Michael Roswell
(74) *Attorney, Agent, or Firm* — Lee & Hayes, PLLC

(57) ABSTRACT

In an implementation of user interface transition, a user interface logon page is displayed with selectable logon controls that each have a corresponding user-identifiable indicator. A transition from the user interface logon page to a user interface desktop page is initiated in response to a selectable logon control being selected. The transition displays the user-identifiable indicator corresponding to the selectable logon control uninterrupted throughout the transition, and the user-identifiable indicator corresponding to the selectable logon control is displayed on the user interface desktop page.

34 Claims, 7 Drawing Sheets

USER INTERFACE TRANSITION

TECHNICAL FIELD

This invention relates to user interface transition.

BACKGROUND

When a computing device is turned-on, or logged-off of by another user, a user of the computing device is presented with a user interface display to logon to the computing device. When the user selects an account to initiate a computing session and provides a password if necessary, the user interface logon display disappears (e.g., is no longer displayed) and, after a delay, the user is presented with a user interface desktop that may include various icons, and selectable commands, files, controls, and/or links by which the user may begin the computing session.

However, when a user initiates the computing session from the user interface logon display, there is no continuity from the user interface logon display to the user interface desktop. The display may appear to change suddenly from the logon display to the desktop display, or a blank display may appear for a duration after the logon display and before the desktop display. This sudden change or blank delay detracts from the overall user experience when interfacing with the computing system.

SUMMARY

User interface transition is described herein.

In an implementation, a user interface logon page is displayed with selectable logon controls that each have a corresponding user-identifiable indicator. A transition from the user interface logon page to a user interface desktop page is initiated in response to a selectable logon control being selected. The transition displays the user-identifiable indicator corresponding to the selectable logon control uninterrupted throughout the transition, and the user-identifiable indicator corresponding to the selectable logon control is displayed on the user interface desktop page.

In another implementation, a user interface logon page is displayed with selectable logon controls that each have a corresponding user-identifiable indicator. A first transition from the user interface logon page to a user interface start page is initiated in response to a selectable logon control being selected and the user-identifiable indicator corresponding to the selectable logon control is displayed uninterrupted throughout the transition. The user interface start page is displayed with the user-identifiable indicator corresponding to the selectable logon control and with user-selectable controls from regions of a user interface desktop page. A second transition from the user interface start page to the user interface desktop page is initiated in response to a user-selectable control being selected on the start page and the user-identifiable indicator corresponding to the selectable logon control is displayed uninterrupted throughout the transition. The user interface desktop page is displayed with the user-identifiable indicator corresponding to the selected one of the user-selectable controls.

BRIEF DESCRIPTION OF THE DRAWINGS

The same numbers are used throughout the drawings to reference like features and components. The design, structure, and functional configurations of the user interfaces illustrated in the drawings are merely exemplary to illustrate various features and aspects of user interface transition. Any number of different user interface designs, structures, and functions may be implemented in varying configurations to implement embodiments of user interface transition.

DETAILED DESCRIPTION

Figure 1:
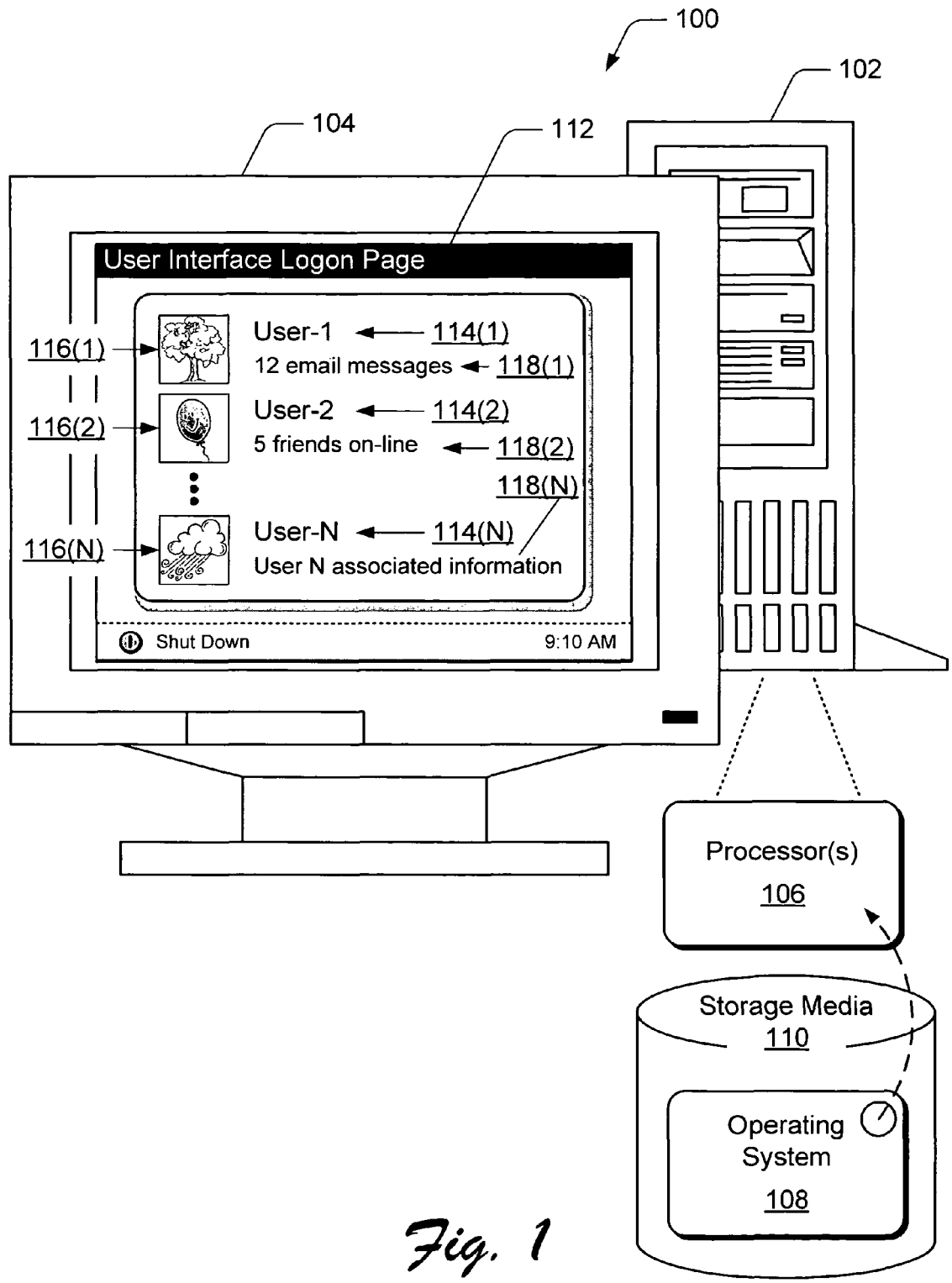
FIG. 1 illustrates various components of a computing system in which an exemplary embodiment of user interface transition can be implemented.

A user interface transition is described in which a user interface logon page is displayed from which a user can log onto a computing system. The user interface logon page includes selectable logon controls that each have a corresponding user-identifiable indicator, such as a user name and/or an image associated with a particular user. A first transition from the user interface logon page to a user interface start page is initiated in response to a selectable logon control being selected, and the user-identifiable indicator(s) corresponding to the selectable logon control are displayed uninterrupted throughout the transition.

The user interface start page is displayed with the user-identifiable indicator(s) (e.g., the user name, image, or associated information) corresponding to the selectable logon control. A second transition from the user interface start page to a user interface desktop page is initiated in response to a user-selectable control being selected on the user interface start page. The user-identifiable indicator(s) corresponding to the selectable logon control are displayed uninterrupted throughout the continued transition. The user interface desktop page is displayed with the user-identifiable indicator(s) from the user interface logon page.

The user interface start page includes the user-identifiable indicator associated with the user of the computing system to indicate that the user is logged-on to the computing system. The user interface start page also includes user-selectable controls, information, and/or resources from one or more regions of the user interface desktop page. The user-selectable controls, information, and resources are displayed on the user interface start page because they are likely of interest to, and/or associated with, the particular user logged onto the computing system. The user interface start page represents a tailored and optionally-configurable representation of a computing session displayed as a desktop page after the transition from the user interface start page. This continuous, seamless, and uninterrupted transition from the user interface logon page to the user interface start page, and from the start page to the user interface desktop page enhances the overall user experience of a computing session.

Further, the user can initiate multiple applications from the user interface start page or from the user interface desktop page. In an implementation, a user interface start page or desktop page includes a user-selectable control to initiate that multiple applications start together at approximately a same time. The user interface includes user-selectable configurations to designate a multiple application start-up configuration. For example, a user can select groups of application programs to start together such as application programs that were executing when a previous computing session was discontinued, application programs often selected for use by the user, application programs recently selected for use by the user, and/or application programs most used by the user.

The following discussion is directed to systems and methods for user interface transition. While features of the described systems and methods can be implemented in any number of different computing environments, they are described in the context of the following exemplary implementations.

FIG. 1 illustrates various components of a computing system 100 in which an exemplary embodiment of user interface transition can be implemented. The computing system 100 includes a computing device 102 and a display device 104 to display operating system user interfaces (also referred to herein as various user interface pages). The computing device 102 includes one or more processors 106 (e.g., any of microprocessors, controllers, and the like) which execute an operating system 108 and process computer executable instructions to implement features of user interface transition.

The computing system 100 can be implemented with one or more memory components, such as any form of storage media 110 (e.g., any of RAM, ROM, and the like), which maintains operating system 108. The computing system 100 may be implemented with any number and combination of differing components as further described below with reference to the exemplary computing systems, devices, and components shown in FIG. 7. Further, although operating system 108 is illustrated and described as a single application program, the operating system 108 can be implemented as several component applications distributed to each perform one or more functions of user interface transition.

In this example, display device 104 displays a user interface logon page 112 that includes any number of selectable logon controls 114(1-N) each corresponding to a user of the computing system 100. Typically, when computing device 102 is turned-on, or logged-off of by another user, the operating system 108 initiates a display of the user interface logon page 112 so that any user of the computing system 100 can logon to the computing device 102.

The user interface logon page 112 also includes user-identifiable indicators that correspond to, or are implemented as, the selectable logon controls 114(1-N). For example, a selectable logon control 114 can be displayed as a user name to identify a user of the computing system 100. Alternatively and/or in addition, a corresponding user-identifiable indicator can be displayed as an image that is recognizable and optionally configurable by a user, such as images 116(1-N) that each correspond to a respective selectable logon control 114(1-N). A user-identifiable image 116 may also be implemented as a selectable logon control 114 on a user interface logon page 112.

The user interface logon page 112 may also include user information 118(1-N) that corresponds to the selectable logon controls 114(1-N) and/or user-identifiable indicators (e.g., images) 116(1-N). In this example, User-1 114(1) corresponding user information 118(1) indicates that User-1 has twelve new e-mail messages, and User-2 114(2) corresponding user information 118(2) indicates that User-2 currently has five friends on-line. User information 118 corresponding to a selectable logon control 114 can include any type or form of information, to include text, a graphic, an image, and/or any combination thereof.

Figure 2:
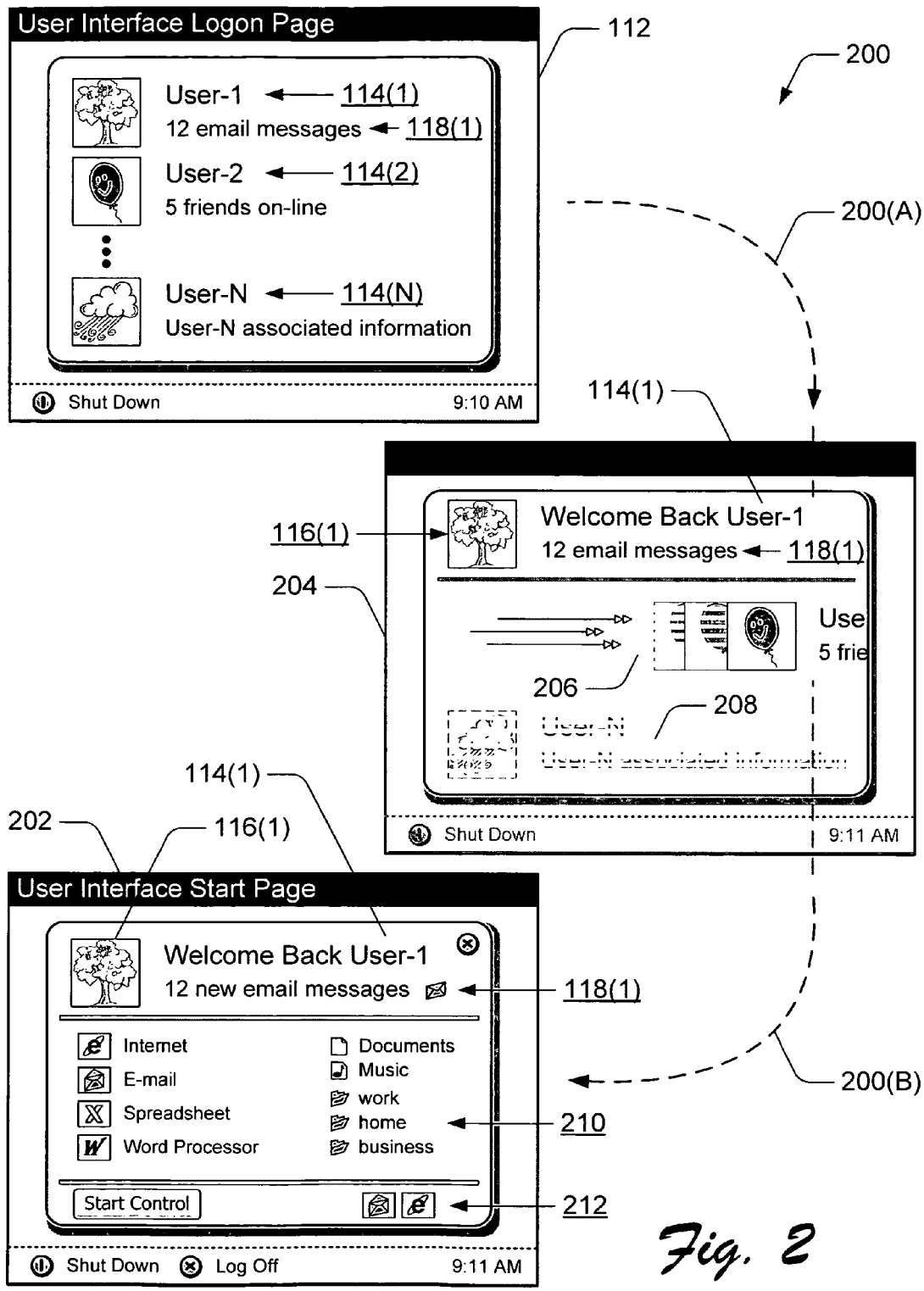
FIG. 2 illustrates an embodiment of a transition from an exemplary user interface logon page to an exemplary user interface start page.

FIG. 2 illustrates an embodiment of a transition 200 from the exemplary user interface logon page 112 to an exemplary user interface start page 202. The transition 200 is illustrated as a continually evolving display with a transition 200(A) from the user interface logon page 112 to transition page(s) 204 and continuing with a transition 200(B) from the transition page(s) 204 to the user interface start page 202. Although shown as only one page or user interface display, transition page 204 is representative of any number of "frames" (e.g., to use a video reference) to represent a continuous, seamless, and uninterrupted transition from the user interface logon page 112 to the user interface start page 202.

During the transition 200, a user-identifiable indicator corresponding to a selectable logon control is displayed uninterrupted throughout the transition. For example, in an event that a user of the computing system 100 selects the selectable logon control 114(1), the user's name, User-1, and/or the corresponding image 116(1) is displayed throughout the transition 200(A-B) on the transition page(s) 204 and on the user interface start page 202. Additionally, User-1 corresponding user information 118(1) may also be displayed throughout the transition 200(A-B) on the transition page(s) 204 and on the user interface start page 202.

The transition page(s) 204 can be visually animated to convey the transition 200 to a user. For example, while the user-identifiable indicators corresponding to the selected logon control for User-1 114(1) are continually displayed throughout the transition, the indicators and information corresponding to User-2 114(2) and User-N 114(N) are eliminated from the display. For example, User-2 114(2) is shown to slide right 206 and off of the display page during the transition page(s) 204. User-N 114(N) is shown to fade away 208 from view on the transition page(s) 204. The indicators and information corresponding to the selectable logon controls that are not selected can be eliminated from the display utilizing any number of methods and techniques to visually animate the transition 200.

The exemplary user interface start page 202 can be displayed with any number of selectable controls 210, information, and application program selectable start controls 212 that, when selected, initiate a display of information and/or an application program associated with the particular user logged-on to the computing system 100. The user interface start page 202 includes (optionally user-definable) information and selectable controls that are more likely of interest and/or associated with the particular user, such as when the user starts the computing device 102 or returns to a computing session. For example, a user interface start page may include any one or combination of application programs, documents, Web links, personal contacts, e-mail, and any other form of information and images such as live data feeds of news, sports, weather, and the like.

Figure 3:
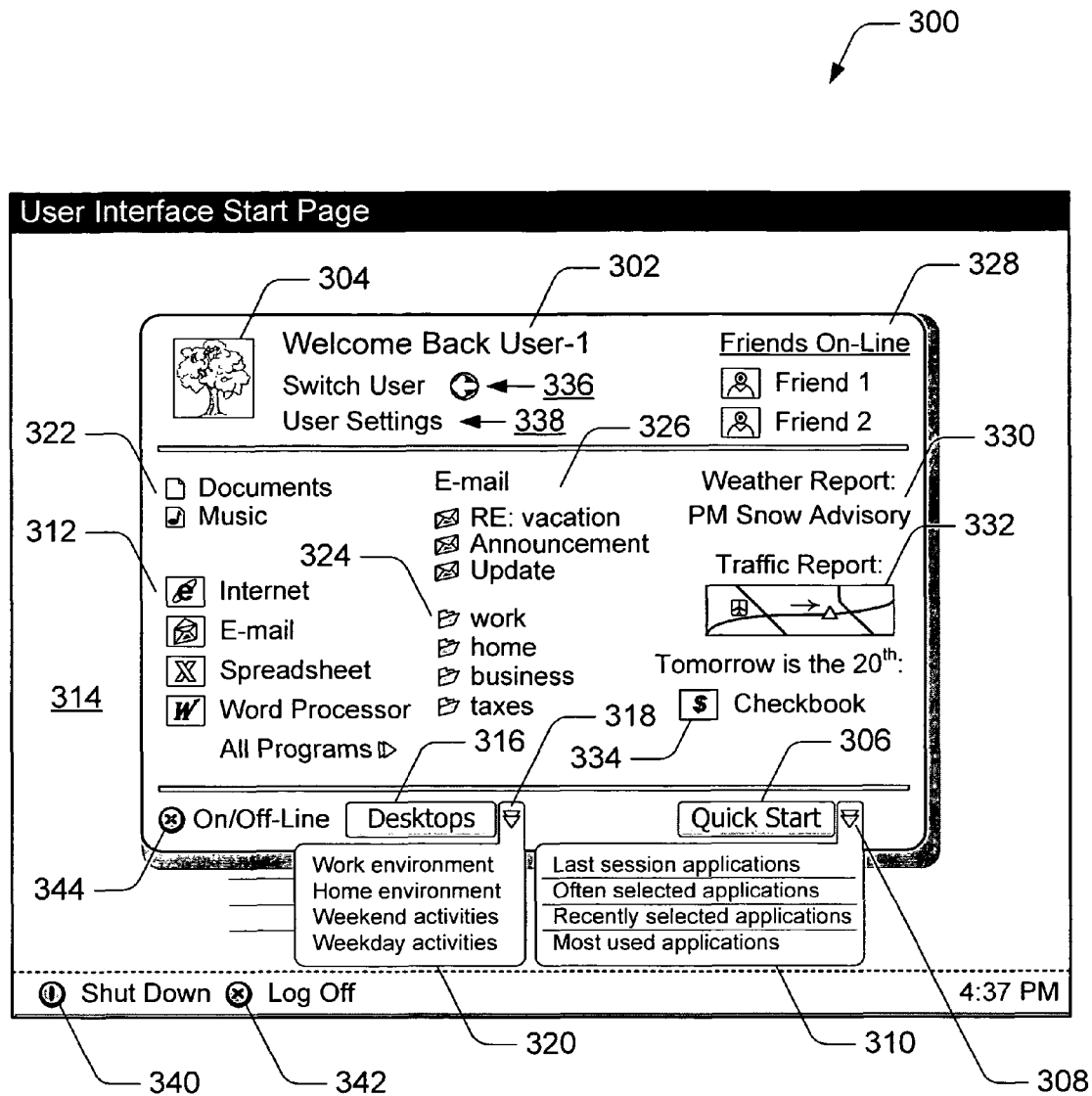
FIG. 3 illustrates various features of an embodiment of a user interface start page.

FIG. 3 illustrates various features of an embodiment of a user interface start page 300 which includes user-identifiable indicators associated with a user of the computing system 100 (FIG. 1) to indicate that the user is logged-on to the computing system. For example, the user interface start page 300 includes a user name 302 and an image 304 as user-identifiable indicators. The user interface start page 300 also includes resources, information, and selectable controls that are more likely of interest and/or associated with the particular user (e.g., User-1 in this example).

The user interface start page 300 includes a start control 306 that is user-selectable to initiate that multiple application programs start together at approximately a same time (e.g., the applications start together after a single user input). The start control 306 may be configurable, or a selectable configuration control 308 may be implemented, such that a user can select to initiate different groups 310 of application programs. In this example, the groups of application programs that can be selected to start together include application programs that were executing when a previous computing session was discontinued, application programs often selected for use by the user, application programs recently selected for use by the user, and/or application programs most used by the user (e.g., application programs executing for at least a minimum duration).

In this example, a user may also select any number of application programs from a list of application programs 312 to initiate that the multiple selected application programs start together at approximately a same time. For example, a user of computing system 100 can individually select various applications, such as an e-mail application, a Web browser, and a word processor from the list of application programs 312, and then initiate that the various selected application programs start together. To initiate starting the selected application programs, a user may simply mouse-click in a region 314 of the user interface start page 300 that is outside of the region containing the information and selectable controls. Alternatively, a user may initiate the selected various applications with a designated user-selectable control, with a keystroke combination input from a keyboard, or with any number of other user-input techniques and/or combinations of sequenced inputs. Further, although initiating multiple application programs is described and illustrated with reference to the user interface start page 300, multiple application programs can also be started together from any user interface desktop page, such as desktop page 402.

The user interface start page 300 includes a desktop selection control 316 that may be configurable, or a selectable configuration control 318 may be implemented, such that a user can select from various desktop pages 320 as a beginning of a computing session. In this example, the various desktop pages 320 include a work environment desktop, a home environment desktop, a weekend activities desktop, and a weekday activities desktop.

A user can select any such desktop environment or page to coincide with a user's "persona" for a particular computing session. For example, a work environment desktop may include information corresponding to a place of business and selectable controls corresponding to work-related application programs. A home environment desktop may include information corresponding to a user's home life, such as the local weather, a TV guide, a movie listing for local movie show times, a personal e-mail account, personal Web links, a personal desktop background image, and/or any combination of these and other information and resources. Similarly, a weekend activities desktop may include some or all of the information and resources included in a home environment desktop, and a weekday activities desktop may include some combination of the information and resources included in the work environment desktop and the home environment desktop. The various desktop environments are configurable for efficiency and ease-of-use corresponding to a particular environment, or persona, that a user selects for a computing session.

The list of application programs 312 may include application programs recently accessed by the user (e.g., in previous computing sessions) and/or application programs designated for user-selection from the user interface start page 300. The user interface start page 300 also includes a list of documents 322 recently accessed by the user and/or documents designated for user-selection from the user interface start page, and a list of directory locations 324 in computing system 100 recently accessed by the user and/or designated for user-selection from the user interface start page. The start page 300 may also include other user-associated information and resources such as a list of e-mail notifications 326 that each correspond to an e-mail received after a previous computing session was discontinued, and a list of on-line users 328 (e.g., friends or buddies that are interconnected on-line). A user can select the friends or on-line users for display notification on the user interface start page 300 when the a designated user is on-line.

The user interface start page 300 can also include any form of a time-based and/or a date-based display of information which may correspond to an environment of the user. For example, a weather report 330 is displayed to advise of impending weather in an area where the user lives, and, after 4:30 p.m. on a weekday, a traffic report 332 may be displayed to advise the user of the traffic conditions for a commute after work. As shown in the user interface start page 300, the time-based and date-based display of information may be text, a graphic, an image, and/or any other form of indication. An example of a date-based user-selectable control 334 is displayed for a financial application program associated with a user that regularly accesses a checkbook on the $20^{th}$ of every month. These are only some examples of the many possible time-based and/or date-based information and application programs that can be displayed on a user interface start page.

The user interface start page 300 can also include various other user-selectable controls and information, such as a switch user control 336 (e.g., a "back" button) to initiate a transition back to the user interface logon page 112 (FIGS. 1-2), and a user settings change control 338 by which a user can configure and change the display settings of the user interface start page 300 and the list information included in the display. The user interface start page 300 also includes a user-selectable shut down control 340 to shutdown computing device 102, and a user-selectable logoff control 342 to logoff of the computing system 100.

The user interface start page 300 may also include a user-configurable on-line selectable control 344 with which a user can designate an on-line status before transitioning onto a desktop environment. Typically, when a user logs-on to a computing system, other users may be configured for display notification that the user is now on-line. However, with the on-line selectable control 344, the user can choose to transition to a desktop environment without other users being notified of a change in the user's on-line status.

Figure 4:
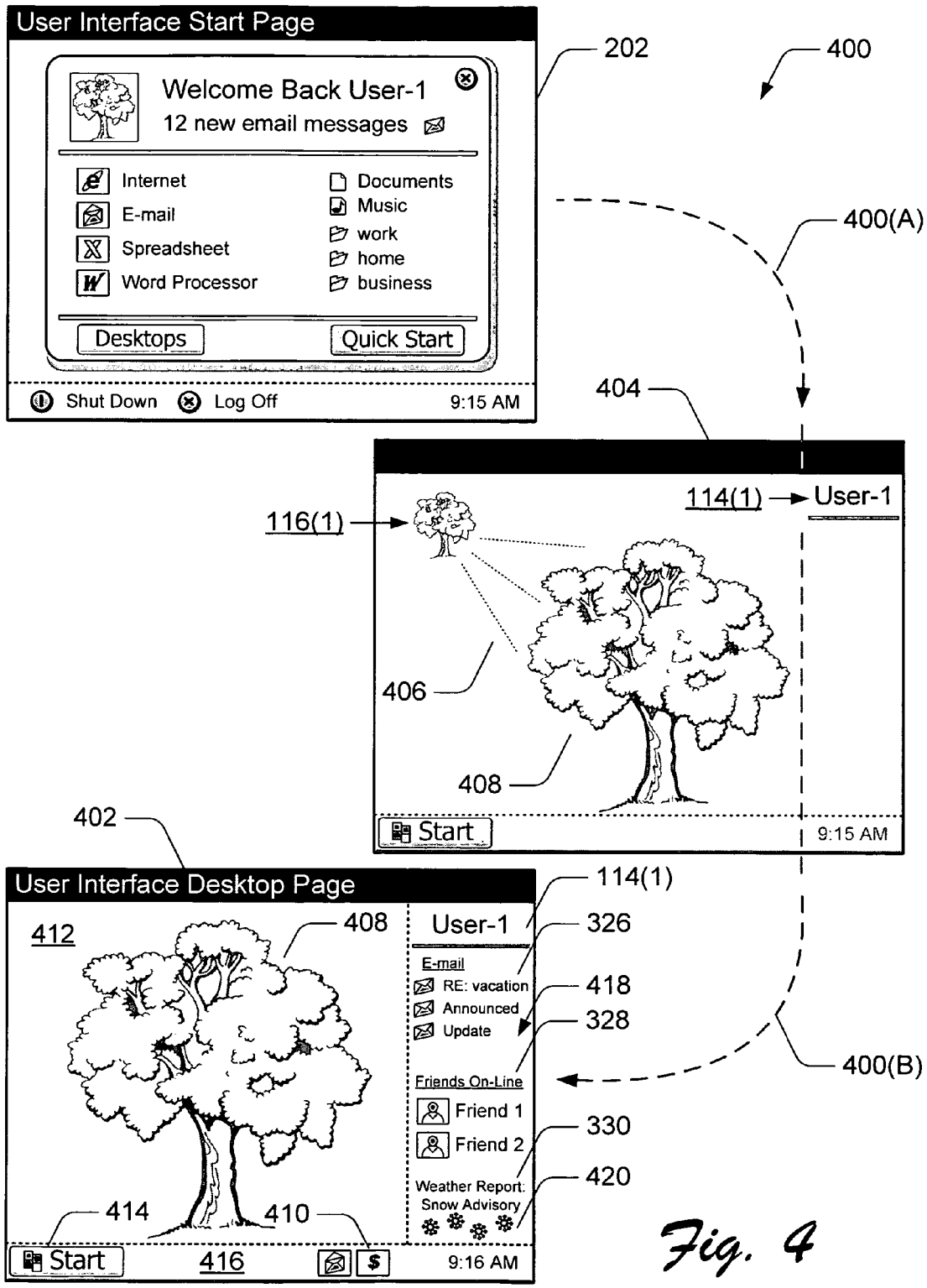
FIG. 4 illustrates an embodiment of a transition from an exemplary user interface start page to an exemplary user interface desktop page.

FIG. 4 illustrates an embodiment of a transition 400 from the exemplary user interface start page 202 to an exemplary user interface desktop page 402. The transition 400 is illustrated as a continually evolving display with a transition 400(A) from the user interface start page 202 to transition page(s) 404 and continuing with a transition 400(B) from the transition page(s) 404 to the user interface desktop page 402. Although shown as only one transition page or user interface display, transition page 404 is representative of any number of "frames" (e.g., to use a video reference) to represent a continuous, seamless, and uninterrupted transition from the user interface start page 202 to the user interface desktop page 402.

During the transition 400, a user-identifiable indicator corresponding to a selectable logon control (e.g., selected from the logon page 112) is displayed uninterrupted throughout the transition. For example, in an event that a user of the computing system 100 selects the selectable logon control 114(1), the user's name, User-1, and/or the corresponding image 116(1)

is displayed throughout the transition 400(A-B) on the transition page(s) 404 and on the user interface desktop page 402. Additionally, the corresponding image 116(1) (or a portion of the image) may transform 406 to a full-size page display 408 of the image while being displayed throughout the transition 400(A-B) on the transition page(s) 404 and on the user interface desktop page 402. Further, the transition page(s) 404 can be visually animated to convey the transition 400 to a user utilizing any number of methods and techniques to visually animate the transition 400.

The exemplary user interface desktop page 402 can be displayed with any number of selectable controls, information, resources, and application program selectable start controls 410 that, when selected, initiate a display of information and/or an application program associated with the particular user logged-on to the computing system 100. The user interface desktop page 402 includes (optionally user-definable) various regions in which the user information and resources are displayed.

In this example, user interface desktop page 402 includes a desktop region 412, a start menu region 414 (e.g., a user-selectable control), a taskbar region 416, and a sidebar region 418. The various regions of the user interface desktop page 402 may include (optionally user-definable) any one or combination of application programs, documents, Web links, personal contacts, e-mail, and any other form of information, resources, and images such as live data feeds of news, sports, weather, and the like. For example, the desktop region includes the full-size page display 408 of the image 116 corresponding to the user currently logged on to computing system 100. Further, the sidebar region 418 includes the list of e-mail notifications 326 that each correspond to an e-mail received after a previous computing session was discontinued, the list of on-line users 328, and the weather report 330. The sidebar region 418 may also include any form of an image or graphic, such as image 420 corresponding to the weather report 330.

Methods for user interface transition, such as exemplary methods 500 and 600 described with reference to FIGS. 5 and 6, respectively, may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
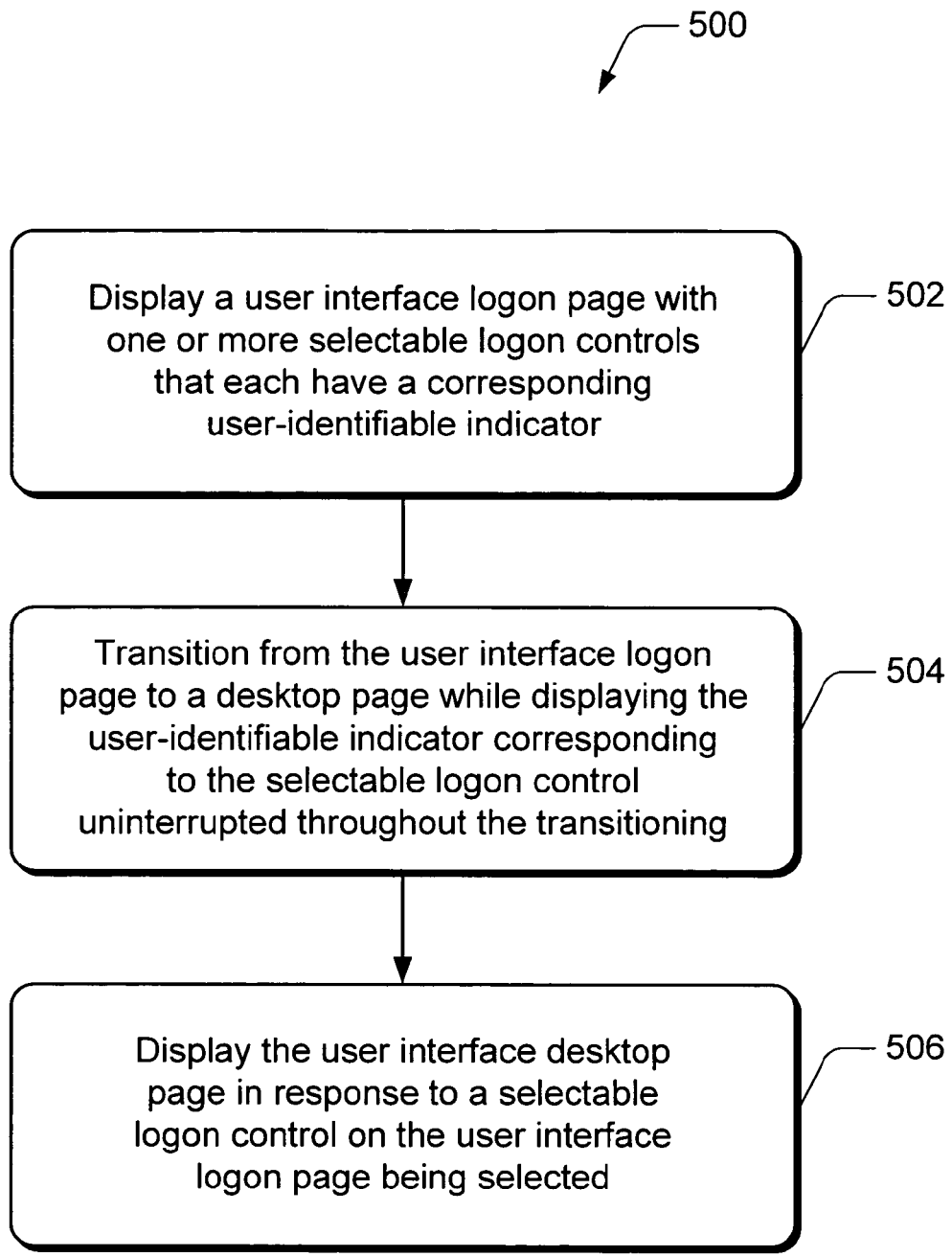
FIG. 5 is a flow diagram that illustrates an exemplary method for an embodiment of user interface transition.

FIG. 5 illustrates an exemplary method 500 for an embodiment of user interface transition. The order in which the method is described is not intended to be construed as a limitation, and any number of the described method blocks can be combined in any order to implement the method. Furthermore, the method can be implemented in any suitable hardware, software, firmware, or combination thereof.

At block 502, a user interface logon page is displayed with one or more selectable logon controls that each have a corresponding user-identifiable indicator. For example, user interface logon page 112 (FIG. 1) is displayed on display device 104 with user names (e.g., User-1, User-2, . . . , User-N) as the selectable logon controls 114(1-N) that each identify a user of computing system 100 by name. The user interface logon page 112 is also displayed with images 116(1-N) as user-identifiable indicators corresponding to the selectable logon controls 114(1-N), respectively. Further, the selectable logon controls 114(1-N) each have corresponding user information 118(1-N), respectively.

At block 504, the user interface logon page transitions to a desktop page while displaying the user-identifiable indicator corresponding to the selectable logon control uninterrupted throughout the transitioning. For example, transitions 200 (FIG. 2) and 400 (FIG. 4) include displaying the user name, User-1, and/or the image 116(1) corresponding to the selectable logon control 114(1) uninterrupted throughout transitions 200(A-B) and 400(A-B) from the user interface logon page 112 to the user interface desktop page 402.

Transitioning from the user interface logon page 112 to the user interface desktop page 402 may also include displaying user information 118(1) corresponding to the selectable logon control 114(1) uninterrupted throughout the transition. Although FIGS. 2 and 4 illustrate a first transition 200 from the user interface logon page 112 to the user interface start page 202, and a second transition 400 from the user interface start page 202 to the user interface desktop page 402, a single transition may be implemented from the user interface logon page 112 to the user interface desktop page 402 as described with reference to method block 504.

At block 506, the user interface desktop page is displayed in response to a selectable logon control being selected on the user interface logon page (e.g., after the transition). For example, user interface desktop page 402 (FIG. 4) is displayed to include user-selectable controls in regions of the desktop page and further includes user-identifiable indicators corresponding to the selectable logon control 114(1), such as a full-size display of image 116(1) and corresponding user name, User-1.

Figure 6:
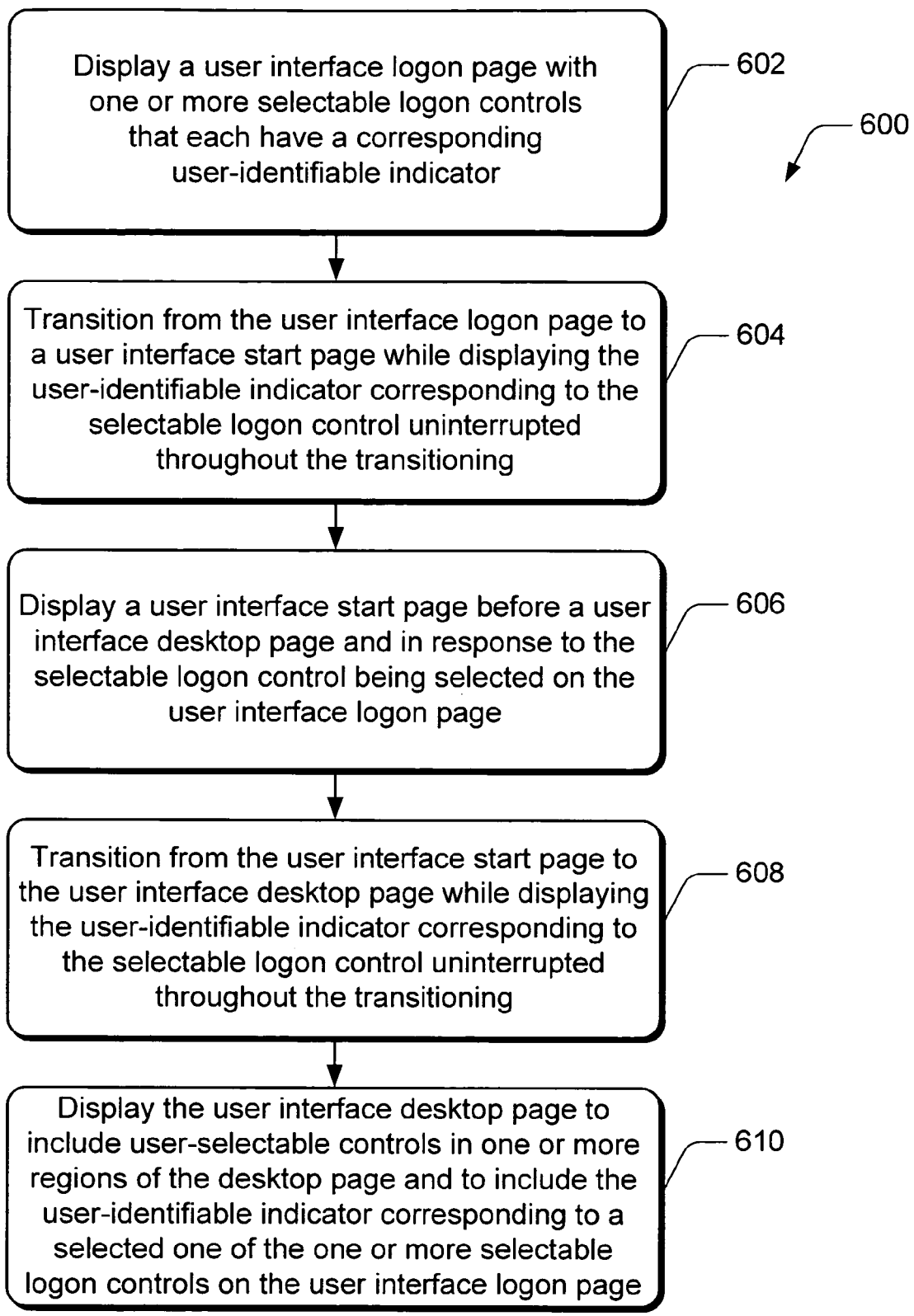
FIG. 6 is a flow diagram that illustrates an exemplary method for an embodiment of user interface transition.

FIG. 6 illustrates an exemplary method 600 for an embodiment of user interface transition. The order in which the method is described is not intended to be construed as a limitation, and any number of the described method blocks can be combined in any order to implement the method. Furthermore, the method can be implemented in any suitable hardware, software, firmware, or combination thereof.

At block 602, a user interface logon page is displayed with one or more selectable logon controls that each have a corresponding user-identifiable indicator. For example, user interface logon page 112 (FIG. 1) is displayed on display device 104 with user names (e.g., User-1, User-2, . . . , User-N) as the selectable logon controls 114(1-N) that each identify a user of computing system 100 by name. The user interface logon page 112 is also displayed with images 116(1-N) as user-identifiable indicators corresponding to the selectable logon controls 114(1-N), respectively.

At block 604, the user interface logon page transitions to a user interface start page while displaying the user-identifiable indicator corresponding to the selectable logon control uninterrupted throughout the transitioning. For example, transition 200 (FIG. 2) includes displaying the user name, User-1, the image 116(1), and/or the user information 118(1) corresponding to the selectable logon control 114(1) uninterrupted throughout the transition 200(A-B) from the user interface logon page 112 to the user interface start page 202.

At block 606, the user interface start page is displayed before the user interface desktop page and in response to the selectable logon control being selected on the user interface logon page (e.g., after the transition). For example, the user interface start page 202 (FIG. 2) is displayed to include user-identifiable indicators corresponding to the selectable logon control 114(1), such as image 116(1) and corresponding user name, User-1. The user interface start page 202 is also displayed to include user-selectable controls 210 and 212 and regional information from any of one or more regions of a desktop page 402 (FIG. 4), such as a taskbar region 416, a sidebar region 418, and a start menu region 414 of the desktop page 402.

At block 608, the user interface start page transitions to the user interface desktop page while displaying the user-identifiable indicator corresponding to the selectable logon control uninterrupted throughout the transitioning. For example, transition 400 (FIG. 4) includes displaying the user name, User-1, and/or the image 116(1) corresponding to the selectable logon control 114(1) uninterrupted throughout the transition 400(A-B) from the user interface start page 202 to the user interface desktop page 402. The transitioning 400(A-B) may also include displaying user information 118(1) corresponding to the selectable logon control 114(1) uninterrupted throughout the transition. During the transition 400 from the user interface start page 202 to the user interface desktop page 402, the user-selectable controls from the regions of the desktop page that are displayed on the user interface start page visibly transition to the regions of the desktop page to further convey a seamless, user-friendly transition to a selected desktop page.

At block 610, the user interface desktop page is displayed to include user-selectable controls in one or more regions of the desktop page and to include the user-identifiable indicator corresponding to a selected one of the one or more selectable logon controls (e.g., after the transition). For example, user interface desktop page 402 (FIG. 4) is displayed to include user-selectable controls in regions of the desktop page and includes user-identifiable indicators corresponding to the selectable logon control 114(1), such as a full-size display of image 116(1) and the corresponding user name, User-1. Further, the user interface desktop page 402 is displayed to include regional information in any of the regions of a desktop page, such as the taskbar region 416, the sidebar region 418, and the start menu region 414 of the desktop page 402.

Figure 7:
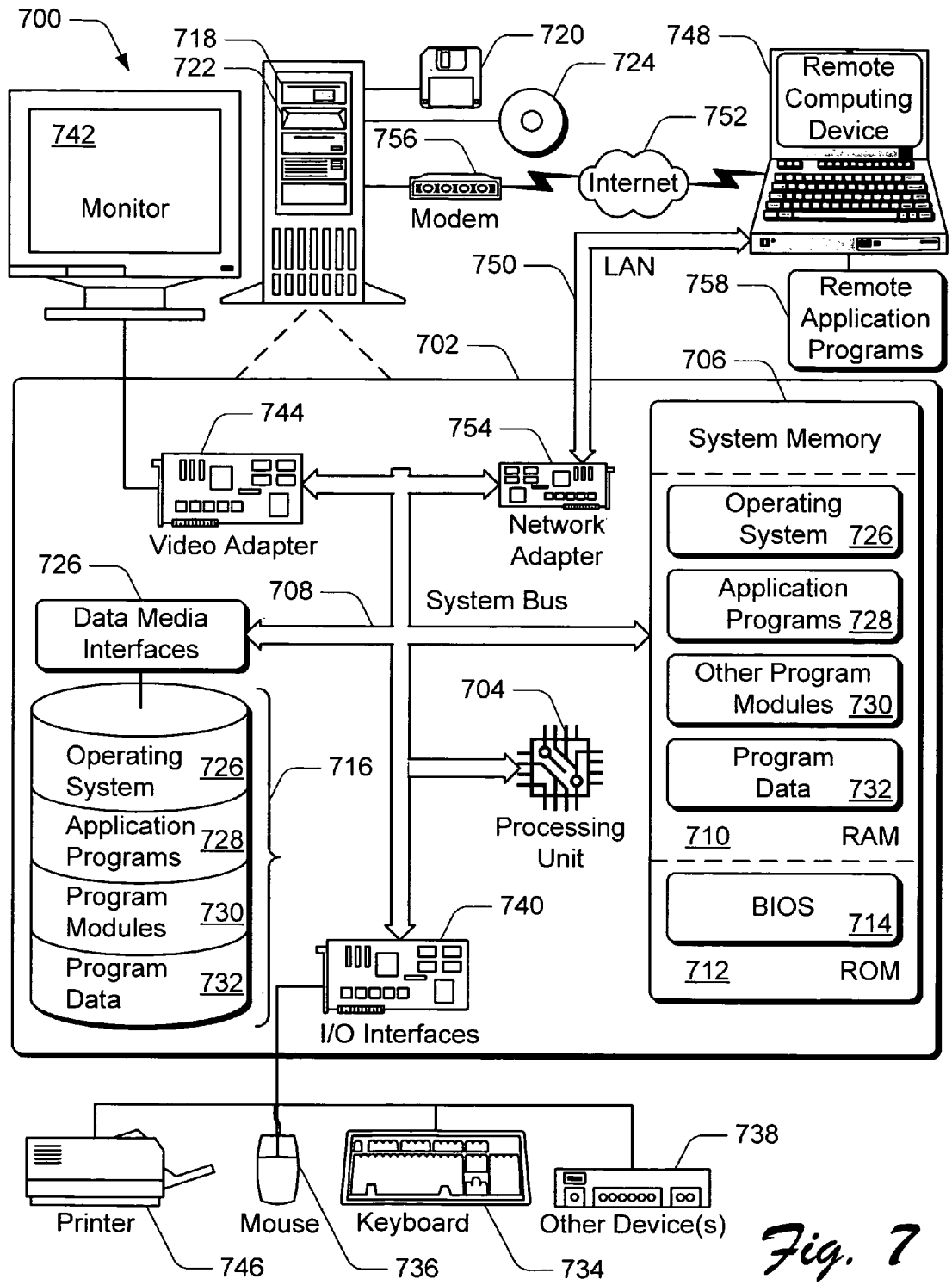
FIG. 7 illustrates exemplary computing systems, devices, and components in an environment that user interface transition can be implemented.

FIG. 7 illustrates an exemplary computing environment 700 within which user interface transition systems and methods, as well as the computing, network, and system architectures described herein, can be either fully or partially implemented. Exemplary computing environment 700 is only one example of a computing system and is not intended to suggest any limitation as to the scope of use or functionality of the architectures. Neither should the computing environment 700 be interpreted as having any dependency or requirement relating to any one or combination of components illustrated in the exemplary computing environment 700.

The computer and network architectures in computing environment 700 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, but are not limited to, one or more processors 704 (e.g., any of microprocessors, controllers, and the like), a system memory 706, and a system bus 708 that couples the various system components. The one or more processors 704 process various computer executable instructions to control the operation of computing device 702 and to communicate with other electronic and computing devices. The system bus 708 represents any number of several types of bus structures, including a memory bus or memory controller, a peripheral bus, an accelerated graphics port, and a processor or local bus using any of a variety of bus architectures.

Computing environment 700 includes a variety of computer readable media which can be any media that is accessible by computing device 702 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714 maintains the basic routines that facilitate information transfer between components within computing device 702, such as during start-up, and is stored in ROM 712. RAM 710 typically contains data and/or program modules that are immediately accessible to and/or presently operated on by one or more of the processors 704.

Computing device 702 may include other removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for computing device 702.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, application programs 728, other program modules 730, and program data 732 (or some combination thereof) may include an embodiment of the systems and methods described herein.

Computing device 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 702 via any number of different input devices such as a keyboard 734 and pointing device 736 (e.g., a "mouse"). Other input devices 738 (not shown specifically) may include a microphone, joystick, game pad, controller, satellite dish, serial port, scanner, and/or the like. These and other input devices are connected to the processors 704 via input/output interfaces 740 that are coupled to the system bus 708, but may be connected by other interface and bus structures, such as a parallel port, game port, and/or a universal serial bus (USB).

A monitor 742 or other type of display device can be connected to the system bus 708 via an interface, such as a video adapter 744. In addition to the monitor 742, other output peripheral devices can include components such as speakers (not shown) and a printer 746 which can be connected to computing device 702 via the input/output interfaces 740.

Computing device 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computing device 702.

Logical connections between computing device 702 and the remote computing device 748 are depicted as a local area network (LAN) 750 and a general wide area network (WAN) 752. Such networking environments are commonplace in offices, enterprise-wide computer networks, intranets, and the Internet. When implemented in a LAN networking environment, the computing device 702 is connected to a local network 750 via a network interface or adapter 754. When implemented in a WAN networking environment, the computing device 702 typically includes a modem 756 or other means for establishing communications over the wide area network 752. The modem 756, which can be internal or external to computing device 702, can be connected to the system bus 708 via the input/output interfaces 740 or other appropriate mechanisms. The illustrated network connections are exemplary and other means of establishing communication link(s) between the computing devices 702 and 748 can be utilized.

In a networked environment, such as that illustrated with computing environment 700, program modules depicted relative to the computing device 702, or portions thereof, may be stored in a remote memory storage device. By way of example, remote application programs 758 are maintained with a memory device of remote computing device 748. For purposes of illustration, application programs and other executable program components, such as the operating system 726, are illustrated herein as discrete blocks, although it is recognized that such programs and components reside at various times in different storage components of the computing device 702, and are executed by the processors 704 of the computing device.

Although embodiments of user interface transition have been described in language specific to structural features and/or methods, it is to be understood that the subject of the appended claims is not necessarily limited to the specific features or methods described. Rather, the specific features and methods are disclosed as exemplary implementations of user interface transition.

The invention claimed is:

1. A computing device, comprising:
   one or more processors;
   memory coupled to the one or more processors; and
   a user interface implemented by executable instructions configured to be performed by the one or more processors, the user interface comprising:
   a start page configured to display one or more selectable logon controls each having a corresponding user-identifiable indicator;
   a desktop page configured to be displayed in response to one of the selectable logon control being selected, the desktop page further-configured to display user selectable controls in one or more regions of the desktop page and persistently display the user identifiable indicator corresponding to the selectable logon control from display of the start page to display of the desktop page;
   a transition from the start page to the desktop page, the transition configured to display after the selectable logon control has been selected but prior to display of the desktop page, the transition configured to display the user-identifiable indicator corresponding to the selectable logon control uninterrupted throughout the transition and to display elimination of non-selected selectable logon controls, thereby enhancing a computing session by providing seamless continuity when a user logs onto the computing system, the start page configured to include a user-configurable on-line selectable control enabling the user to designate an on-line status that is to be displayed to other users prior to, throughout, and subsequent to the transitioning from the start page to the desktop page without a change in the on-line status; and
   a start control displayed on the desktop page that is user-selectable to initiate that multiple applications start together at approximately a same time, the start control being configured to enable the user to select groups of applications to start together that were executing when a previous computing session was discontinued, that are often selected for use by the user, that were recently selected for use by the user, and that are most used by the user.

2. A computing device as recited in claim 1, wherein the user-identifiable indicator is a user name corresponding to the selectable logon control for a user identified by the user name, and wherein the user name is displayed uninterrupted throughout the transition from the start page to the desktop page.

3. A computing device as recited in claim 1, wherein the user-identifiable indicator is an image corresponding to the selectable logon control, and wherein the image is displayed uninterrupted throughout the transition from the start page to the desktop page.

4. A computing device as recited in claim 1, wherein the user-identifiable indicator is an image corresponding to the selectable logon control, and wherein the image transforms to a full-size page display while being displayed uninterrupted throughout the transition from the start page to the desktop page.

5. A computing device as recited in claim 1, wherein the user-identifiable indicator is a portion of an image corresponding to the selectable logon control, and wherein the portion of the image transforms to a full-size page display of the image while being displayed uninterrupted throughout the transition from the start page to the desktop page.

6. A computing device as recited in claim 1, wherein the start page is further configured to display the one or more selectable logon controls each having corresponding user information, and wherein the transition is further configured to display the user information corresponding to the selectable logon control uninterrupted throughout the transition.

7. A method, comprising:
   displaying, by a computing device, a logon page with one or more selectable logon controls that each have a corresponding user-identifiable indicator;
   displaying, by the computing device, a desktop page in response to a selectable logon control being selected, the user interface desktop page including user selectable controls in one or more regions of the desktop page and including persistent display of the user identifiable indicator corresponding to the selectable logon control from display of the logon page to display of the desktop page;

enabling, by the computing device, a user to initiate that multiple applications start together at approximately a same time, the enabling including enabling the user to select groups of applications to start together that were executing when a previous computing session was discontinued, that are often selected for use by the user, that were recently selected for use by the user, and that are most used by the user;

transitioning, by the computing device, from the logon page to the desktop page, such that a transition is configured to display after the selectable logon control has been selected but prior to display of the desktop page, and wherein the transition is further configured to display the user-identifiable indicator corresponding to the selectable logon control uninterrupted throughout the transitioning and to display elimination of non-selected selectable logon controls; and providing, by the computing device, the user an online selectable control that enables the user to designate an on-line status that is to be displayed to other users prior to, throughout, and subsequent to the transitioning from the logon page to the desktop without a change in the on-line status.

8. A method as recited in claim 7, further comprising displaying a user name as the user-identifiable indicator corresponding to the selectable logon control for a user identified by the user name, and wherein the transitioning includes displaying the user name uninterrupted throughout the transitioning from the logon page to the desktop page.

9. A method as recited in claim 7, further comprising displaying an image as the user-identifiable indicator corresponding to the selectable logon control, and wherein the transitioning includes displaying the image uninterrupted throughout the transitioning from the logon page to the desktop page.

10. A method as recited in claim 7, wherein displaying the logon page includes displaying the logon page of the one or more selectable logon controls that each have corresponding user information, and wherein the transitioning includes displaying the user information corresponding to the selectable logon control uninterrupted throughout the transitioning from the logon page to the desktop page.

11. One or more computer readable storage media comprising computer executable instructions that, when executed, direct a computing device to perform the method of claim 7.

12. A computing device, comprising:
one or more processors;
memory coupled to the one or more processors; and
a user interface implemented by executable instructions configured to be performed by the one or more processors, the user interface comprising:
a logon page configured to display one or more selectable logon controls each having a corresponding user-identifiable indicator;
a desktop page configured to display user selectable controls in one or more regions of the desktop page and persistently display the user identifiable indicator corresponding to a selected one of the one or more selectable logon controls from display of the logon page to display of the desktop page;
a start page configured to display before the desktop page and in response to the selectable logon control being selected on the logon page, the start page configured to display the user-identifiable indicator corresponding to the selectable logon control and display one or more of the user selectable controls from any of the one or more regions of the desktop page, the start page further configured to display a user-configurable on-line selectable control enabling the user to designate an on-line status that is to be displayed to other users prior to and subsequent to display of the desktop page without notifying the other users of a change in the on-line status;
a start control displayed on the start page that is user-selectable to initiate that multiple applications start together at approximately a same time, the start control being configured to enable the user to select groups of applications to start together that were executing when a previous computing session was discontinued, that are often selected for use by the user, that were recently selected for use by the user, and that are most used by the user; and
a transition from the logon page to the start page, the transition configured to display the user-identifiable indicator corresponding to the selectable logon control uninterrupted throughout the transition and to display elimination of non-selected selectable logon controls.

13. A computing device as recited in claim 12, wherein the user interface further comprises a transition from the start page to the desktop page, the transition configured to display the user-identifiable indicator corresponding to the selectable logon control uninterrupted throughout the transition.

14. A computing device as recited in claim 12, wherein the user interface further comprises:
a first transition from the logon page to the start page, the first transition configured to display the user-identifiable indicator corresponding to the selectable logon control uninterrupted throughout the first transition; and
a second transition from the start page to the desktop page, the second transition configured to display the user-identifiable indicator corresponding to the selectable logon control uninterrupted throughout the second transition.

15. A computing device as recited in claim 12, wherein the desktop page is further configured to display regional information in one or more of the regions of the desktop page, and wherein the start page is further configured to display the regional information from any of the one or more regions of the desktop page.

16. A computing device as recited in claim 12, wherein the user-identifiable indicator is a user name corresponding to the selectable logon control for a user identified by the user name, and wherein the user name is displayed uninterrupted throughout a first transition from the logon page to the start page and continues to be displayed uninterrupted throughout a second transition from the start page to the desktop page.

17. A computing device as recited in claim 12, wherein the user-identifiable indicator is an image corresponding to the selectable logon control, and wherein the image is displayed uninterrupted throughout a first transition from the logon page to the start page and continues to be displayed uninterrupted throughout a second transition from the start page to the desktop page.

18. A computing device as recited in claim 12, wherein the logon page is further configured to display the one or more selectable logon controls each having corresponding user information, and wherein the user information corresponding to the selectable logon control is displayed uninterrupted throughout a first transition from the logon page to the start page and continues to be displayed uninterrupted throughout a second transition from the start page to the desktop page.

19. A computing device as recited in claim 12, wherein the desktop page includes at least one of a taskbar region, a sidebar region, and a start menu region, and wherein the start page is further configured to display the one or more user selectable controls from any of the taskbar region, sidebar region, and start menu region of the desktop page.

20. A method, comprising:
displaying, by a computing device, a logon page with one or more selectable logon controls that each have a corresponding user-identifiable indicator;
displaying, by the computing device, a desktop page that includes user selectable controls in one or more regions of the desktop page and that includes persistent display of the user identifiable indicator corresponding to a selected one of the one or more selectable logon controls from display of the logon page to display of the desktop page;
displaying, by the computing device, a start page before the desktop page and in response to the selectable logon control being selected on the logon page, the start page including the user-identifiable indicator corresponding to the selectable logon control and including one or more of the user selectable controls from any of the one or more regions of the desktop page, the start page further including an online selectable control that enables a user to designate an on-line status that is to be displayed to other users prior to and subsequent to display of the desktop page without a change in the on-line status;
enabling, by the computing device, the user to initiate that multiple applications start together at approximately a same time, the enabling including enabling the user to select groups of applications to start together that were executing when a previous computing session was discontinued, that are often selected for use by the user, that were recently selected for use by the user, and that are most used by the user; and
transitioning, by the computing device, from the start page to the desktop page while displaying the user-identifiable indicator corresponding to the selectable logon control uninterrupted throughout the transitioning and displaying elimination of non-selected selectable logon controls.

21. A method as recited in claim 20, further comprising transitioning from the logon page to the start page while displaying the user-identifiable indicator corresponding to the selectable logon control uninterrupted throughout the transitioning.

22. A method as recited in claim 20, further comprising:
transitioning first from the logon page to the start page while displaying the user-identifiable indicator corresponding to the selectable logon control uninterrupted throughout the first transitioning; and
transitioning second from the start page to the desktop page while displaying the user-identifiable indicator corresponding to the selectable logon control uninterrupted throughout the second transitioning.

23. A method as recited in claim 20, wherein displaying the desktop page includes displaying the desktop page with regional information in one or more of the regions of the desktop page, and wherein displaying the start page includes displaying the start page with the regional information from any of the one or more regions of the desktop page.

24. A method as recited in claim 20, further comprising:
displaying a user name as the user-identifiable indicator corresponding to the selectable logon control for a user identified by the user name; and
transitioning from the logon page to the start page and from the start page to the desktop page while displaying the user name uninterrupted throughout the transitioning.

25. A method as recited in claim 20, further comprising:
displaying an image as the user-identifiable indicator corresponding to the selectable logon control; and
transitioning from the logon page to the start page and from the start page to the desktop page while displaying the user name uninterrupted throughout the transitioning.

26. A method as recited in claim 20, further comprising transitioning from the logon page to the start page and from the start page to the desktop page while displaying user information corresponding to the selectable logon control uninterrupted throughout the transitioning.

27. A method as recited in claim 20, wherein displaying the desktop page includes displaying the desktop page with at least one of a taskbar region, a sidebar region, and a start menu region, and wherein displaying the start page includes displaying the start page with the one or more user-selectable controls from any of the taskbar region, sidebar region, and start menu region of the desktop page.

28. One or more computer readable storage media comprising computer executable instructions that, when executed, direct a computing device to perform the method of claim 20.

29. One or more computer readable storage media comprising computer executable instructions that, when executed, direct a computing system to:
display a logon page with one or more selectable logon controls that each have a corresponding user-identifiable indicator;
transition from the logon page to a start page in response to one of the one or more selectable logon controls being selected while displaying the user-identifiable indicator corresponding to the selected one of the one or more selectable logon controls uninterrupted throughout the transition to the start page and displaying elimination of non-selected selectable logon controls;
display the start page to include the user-identifiable indicator corresponding to the selectable logon control and to include one or more user selectable controls from any of one or more regions of a desktop page, the start page including an online selectable control that enables a user to designate an on-line status that is to be displayed to other users prior to and subsequent to display of the desktop page without notifying the other users of a change in the on-line status;
enable the user to initiate that multiple applications start together at approximately a same time, the enabling including enabling the user to select groups of applications to start together that were executing when a previous computing session was discontinued, that are often selected for use by the user, that were recently selected for use by the user, and that are most used by the user;
transition from the start page to the desktop page while displaying the user-identifiable indicator corresponding to the selectable logon control uninterrupted throughout the transition to the desktop page; and
display the desktop page to include persistent display of the user-identifiable indicator corresponding to the selectable logon control and to include the one or more user selectable controls and additional user-selectable controls displayed in the one or more regions of the desktop page.

30. One or more computer readable storage media as recited in claim 29, further comprising computer executable instructions that, when executed, direct the computing system to display the desktop page to include regional information in the one or more regions of the desktop page, and display the start page to include the regional information from any of the one or more regions of the desktop page.

31. One or more computer readable storage media as recited in claim 29, further comprising computer executable instructions that, when executed, direct the computing system to display the desktop page to include at least one of a taskbar region, a sidebar region, and a start menu region, and display the start page to include the one or more user-selectable controls from any of the taskbar region, sidebar region, and start menu region of the desktop page.

32. One or more computer readable storage media as recited in claim 29, further comprising computer executable instructions that, when executed, direct the computing system to transition from the logon page to the start page and from the start page to the desktop page while displaying a user name as the user-identifiable indicator corresponding to the selectable logon control.

33. One or more computer readable storage media as recited in claim 29, further comprising computer executable instructions that, when executed, direct the computing system to transition from the logon page to the start page and from the start page to the desktop page while displaying an image as the user-identifiable indicator corresponding to the selectable logon control.

34. One or more computer readable storage media as recited in claim 29, further comprising computer executable instructions that, when executed, direct the computing system to display the logon page of the one or more selectable logon controls that each have corresponding user information, and transition from the logon page to the start page and from the start page to the desktop page while displaying user information corresponding to the selectable logon control.

* * * * *